United States Patent [19]
Enderlein et al.

[11] Patent Number: 5,806,657
[45] Date of Patent: Sep. 15, 1998

[54] SUSPENSION CONVEYOR SYSTEM

[75] Inventors: Robby Enderlein, Landsberg a. Lech; Johann Robu, Olching, both of Germany; Hansjörg Geiger, Schwaz, Austria

[73] Assignee: MTS Modulare Transport Systeme GmbH, Vomp, Austria

[21] Appl. No.: 727,549

[22] PCT Filed: Apr. 10, 1995

[86] PCT No.: PCT/EP95/01305

§ 371 Date: Oct. 1, 1996

§ 102(e) Date: Oct. 1, 1996

[87] PCT Pub. No.: WO95/27674

PCT Pub. Date: Oct. 19, 1995

[30] Foreign Application Priority Data

Apr. 12, 1994 [DE] Germany ............................ 9406059 U

[51] Int. Cl.⁶ ................................................. B65G 17/32
[52] U.S. Cl. ................... 198/680; 198/687.1; 198/465.4
[58] Field of Search ................................ 198/680, 687.1, 198/465.4

[56] References Cited

U.S. PATENT DOCUMENTS

| | | | |
|---|---|---|---|
| 2,816,643 | 12/1957 | Klamp | 198/680 |
| 3,454,148 | 7/1969 | Harrison | 198/465.4 |

FOREIGN PATENT DOCUMENTS

| | | |
|---|---|---|
| 2 670 190 | 6/1992 | France . |
| 1 937 491 | 4/1971 | Germany . |

Primary Examiner—Joseph E. Valenza
Assistant Examiner—Mark Deuble
Attorney, Agent, or Firm—Lyon & Lyon LLP

[57] ABSTRACT

A suspension conveyor system with a multiplicity of rollers traveling on a rail network. A load attachment device with a hook designed to carry the hook of a clothes hanger is pivotally mounted on each roller in order to permit loading and unloading of the hook. The load attachment device also has an inclined slide ramp thereon opposite the opening of the hook which engages a leading ramp on a rail parallel to the path of conveyance at a loading/unloading station to pivot the load attachment device into a raised position in which the hook of the clothes hanger to drop through an opening between the slide ramp and onto the rail. When the slide ramp contacts one of a row of clothes hanger already deposited on the rail the load attachment device will pivot upward slightly to lift the end of the hook from the rail thereby releasing the hook of the clothes hanger. The load attachment device will pivot slightly downwards after the slide ramp has cleared the last clothes hanger in the row so that the end of the hook will engage the hook of the last clothes hanger in the row. The rail has a longitudinal recess is formed in its trailing edge which allows the hook to drop below the top surface of the rail and capture the hook the clothes hanger in the bottom of the hook of the load attachment device.

7 Claims, 4 Drawing Sheets

SUSPENSION CONVEYOR SYSTEM

The invention relates to a suspension conveyor system comprising a plurality of roller apparatuses displaceable on a rail network, the lower end of each roller apparatus being provided with a load carrying means including a load receiving means having a load hook for receiving a coat hanger hook, wherein the side of the load hook oriented in the conveying direction comprises a hook portion extending upwardly, the upper end of the hook portion being confined by an aperture.

The invention solves the problem of how to design a suspension conveyor system of the abovementioned type such as to allow the load receiving means of the roller apparatuses to be automatically charged and discharged as easily as possible.

According to the invention, this object is achieved by the features that the load receiving means is hinged to the load carrying means to be pivotable, against the conveying direction, about a horizontal axis up to a raised position in which the aperture is facing to the bottom, that a slide ramp is arranged on the load receiving means on the side of the aperture opposite to the upwardly extending hook portion, that a charging/discharging station is provided having a rail extending parallelly to the conveying direction in the travelling path of the load receiving means, from which rail the coat hanger hooks can be suspended, the end of the rail opposite to the conveying direction comprising a guiding ramp cooperating with the slide ramp to pivot the respective load receiving means to its raised position, the end of the rail oriented in the conveying direction comprising a longitudinal recess opening towards the top and in the conveying direction, said longitudinal recess being formed such as to allow the slide ramp and the hook portion to enter the longitudinal recess.

Thus, when the load receiving means are to be charged with coat hangers suspended from the rail, the empty load receiving means of an arriving roller apparatus is pivoted rearwards, to the raised position, at the guiding ramp. Then, the slide ramp of the raised load receiving means slides over the coat hanger hooks on the rail, and the free end of the hook portion rides over the coat hanger hooks at a distance above the rail, until the load receiving means pivots back behind the last coat hanger hook such that the slide ramp abuts onto the rail. The return pivoting movement of the load receiving means also lowers the free end of the hook portion until said free end contacts the rail, resulting in the free end of the hook portion entraining the last coat hanger hook once the latter has been caught in the aperture of the load hook, and dragging this coat hanger on the rail to the front end thereof. There, the slide ramp of the load receiving means is released by the rail allowing the load receiving means to pivot further downwards. In this way, the slide ramp and the hook portion enter the longitudinal recess in the rail and engage the entrained coat hanger hook from below which then slides into the load hook and is freely suspended therefrom behind the rail.

Conversely, when a coat hanger hook suspended from a load hook of the load receiving means of a roller apparatus arrives at the guiding ramp of the rail, the load receiving means is pivoted upwards to its raised position and the coat hanger hook slips from the hook portion, which slightly descends in this position, until the coat hanger hook is inserted in the aperture and entrained on the rail by the free end of the hook portion until the slide ramp arrives at coat hanger hooks already deposited and retained on the rail, or at a lifter displaced onto the rail, whereby the load receiving means is further raised and releases the coat hanger hook previously entrained.

The charging/discharging station may be arranged at a bypass branch connected to the rail network of the suspension conveyor system through switches.

Preferably, the free end of the hook portion confined by the aperture is in the form of a tip bent outwardly in an oblique manner; thus, the free end of the hook portion can slightly engage the coat hanger hook, which is made of round wire, from below already on the rail. In addition, a restoring spring may be provided urging the load receiving means downwards in the raised position thereof.

The longitudinal recess in the rear end of the rail, as seen in the conveying direction, may be provided as a slot opening to the bottom. Preferably, however, the longitudinal recess has a gliding bottom obliquely descending in the conveying direction, whereby the load receiving means is not lowered abruptly but gradually upon arrival of the free end of the hook portion. This arrangement provides the advantage that when the load hook is charged with a coat hanger hook, the latter is received smoothly and without shocks. When an empty load receiving means is lowered gradually, this implies that the completely lowered load receiving means does not swing significantly.

The invention lends itself not only to individually conveyed roller apparatuses, in which the load receiving means are mounted directly to the lower ends of the roller apparatuses, but in particular also to tandem trolleys, in which two roller apparatuses are interconnected through a load bar from which a plurality of load receiving means according to the invention are pivotably suspended. In this case, the load receiving means are spaced from each other such as to avoid mutual collision when they are pivoted upwards. Charging and discharging of the load receiving means is carried out successively in the above-described manner.

The invention will be explained with reference to embodiments shown at least schematically in the drawing figures. In the drawings, FIG. 1 illustrates a charging/discharging station according to the invention when the load receiving means of the roller apparatuses are discharged;

Figure 1:
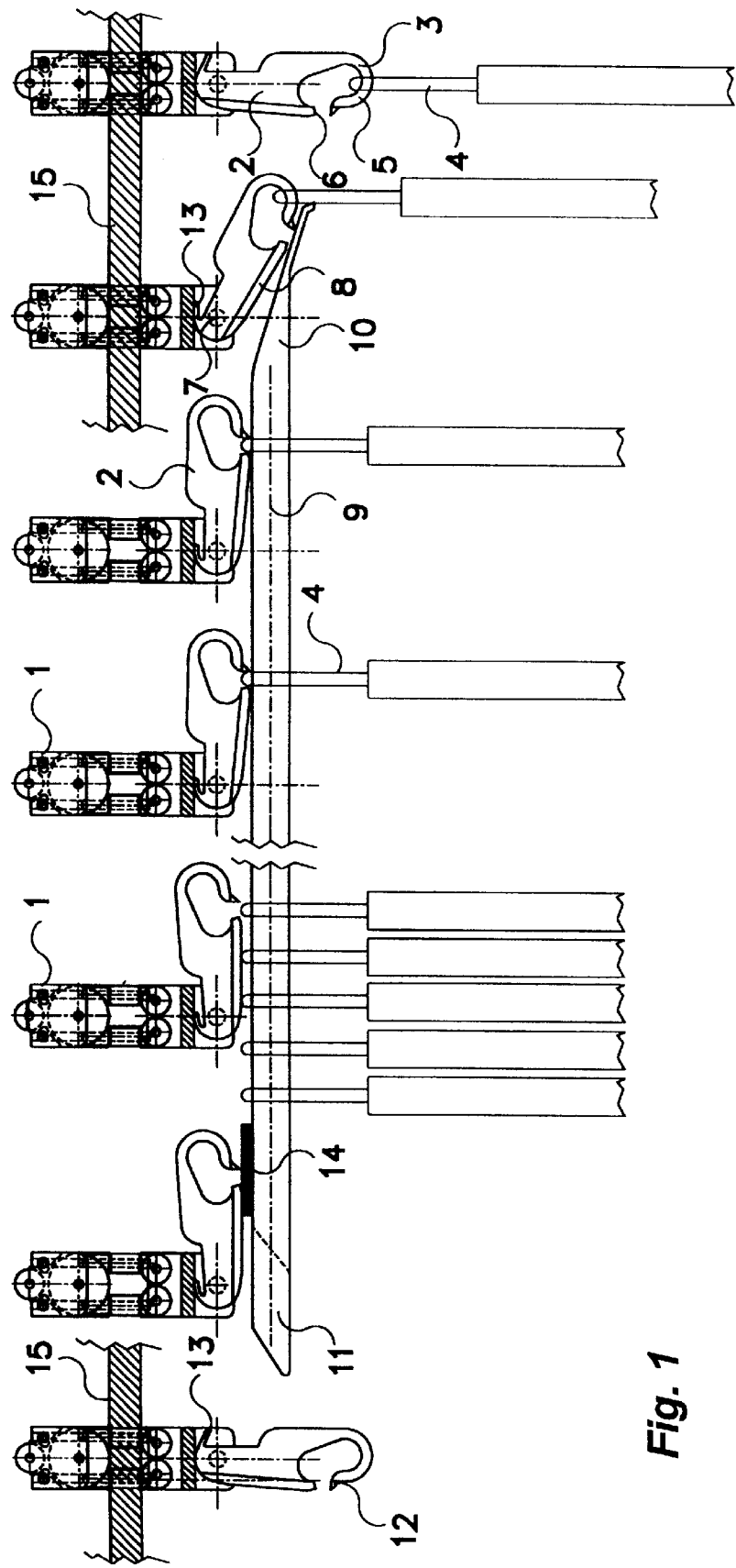

The suspension conveyor system comprises a rail network 15 on which roller apparatuses 1 are conveyed by means of drivers (not shown). The lower end of each roller apparatus is provided with a load carrying means 16 for supporting a load receiving means 2 pivotable with respect to the roller apparatus 1 about an axis 7 extending perpendicularly to the conveying direction. The load receiving means 2 comprises a load hook 3 for carrying a coat hanger hook 4. In the drawing figures, the conveying operation is assumed to take place towards the left-hand side; the side of load hook 3 oriented in the conveying direction comprises a hook portion 5 extending upwardly, at least the inner part of hook portion 5 being slightly bevelled outwardly; the free end of hook portion 5 is confined by an aperture 6 and tapers into an outwardly bent tip 12. A slide ramp 8 is arranged above aperture 6.

The charging/discharging station shown in the drawing is provided with a horizontal rail 9 extending parallelly to the conveying direction in the travelling path of the load receiving means 2 of the roller apparatuses 1. The hooks 4 of coat hangers can be suspended from rail 9. The front end of the rail, as seen in the conveying direction, is equipped with an upwardly extending guiding ramp 10 onto which the slide ramps of the arriving roller apparatuses 1 abut, thus pivoting the respective load receiving means 2 rearwards into the raised position. The rear end of rail 9 is bifurcated in the longitudinal direction, forming a slot-like longitudinal recess 11 between the legs of the fork, said recess 11 opening towards its top and front faces. According to FIG. 1, a plate-like lifter 14 may be displaced onto rail 9; as the load receiving means 2 abut against lifter 14, the latter acts as a stop at which coat hanger hooks 4 can be accumulated after having been entrained along the rail.

FIG. 1 illustrates how coat hanger hooks 4 suspended from the load hooks 3 of the load receiving means 2 of the roller apparatuses 1 are deposited on rail 9. The load receiving means 2 conveyed from the right-hand side of the Figure arrives at guiding ramp 10 and is slightly pivoted rearwards by said ramp, thus raising the coat hanger hook 4 onto guiding ramp 10. Behind the guiding ramp 10, the load receiving means 2 is pivoted further upwards against the force of a restoring spring 13 arranged in the form of a resilient tab of the load receiving means 2 according to the embodiment shown in FIGS. 1 and 2. As a result, the coat hanger hook 4 glides downwards—along hook portion 5 now extending slightly downwards—through aperture 6 and onto rail 9. Then the coat hanger hook 4 is dragged along rail 9 by the tip 12 of load hook 3 until slide ramp 8 abuts onto other coat hanger hooks 4 retained on rail 9 by means of stop plate 14. This causes the load receiving means 2 to be pivoted even further upwards resulting in the tip 12 of load hook 3 releasing the conveyed coat hanger hook 4. Thereafter, slide ramp 8 slides over the retained coat hanger hooks and over the lifter 14 displaced onto the rail, until the slide ramp 8 is released from the rear end of rail 9.

In its raised position, the lowermost part of the slide ramp 8 of the load receiving means 2 rests on rail 9; thus, said lowermost part of slide ramp 8 and the free end of hook portion 5 (i.e. the free end of tip 12 in the embodiment shown) are arranged with respect to each other such as to be concurrently in contact with rail 9 when the rail is free of obstacles and the slide ramp 8 is in contact with rail 9, and such that the free end of hook portion 5 is spaced from the top surface of rail 9 by more than the thickness of the coat hanger hooks 4 or, as the case may be, by more than the distance of the apices of the coat hanger hooks 4 from the top surface of rail 9, when the slide ramp 8 slides over a coat hanger hook 4 or the lifter 14. The second-mentioned condition must be met in any event, whereas the first-mentioned condition does not necessarily have to be met if the rail 9 comprises a slot or longitudinal groove in its top surface receiving the free end of hook portion 5 when the slide ramp 8 rests on the top surface of rail 9. This may be advantageous in entraining the coat hanger hook 4 by means of the free end of hook portion 5.

Figure 2:
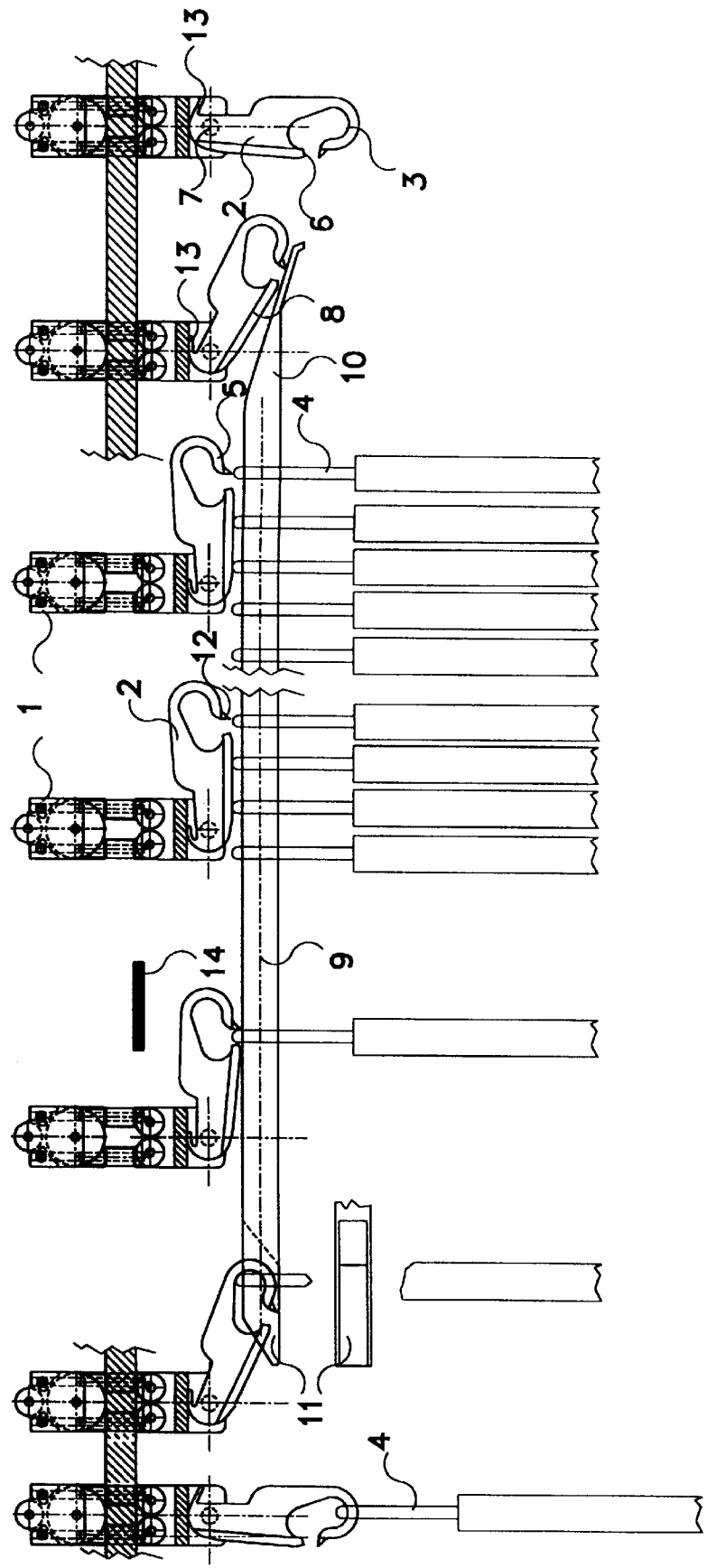
FIG. 2 shows the charging/discharging station when the load receiving means of the roller apparatuses are charged with coat hangers.

FIG. 2 illustrates how a coat hanger hook 4 is automatically picked up into the load hook 3 of the load receiving means 2 of a roller apparatus 1. Again, the load receiving means 2 is pivoted rearwards and raised by the guiding ramp 10 of rail 9. Slide ramp 8 of the load receiving means 2 then slides over the coat hanger hooks 4 suspended from rail 9 until slide ramp 8 is released behind the last coat hanger hook 4, thereby pivoting slightly downwards to abut on rail 9 such that said last coat hanger hook 4 is caught by aperture 6 and the tip 12 of load hook 3 contacts rail 9. As a consequence, coat hanger hook 4 is dragged to the longitudinal recess 11 at the rear end of the rail. This causes the load receiving means 2 to pivot further downwards because the slide ramp 8 and the hook portion 5 enter the longitudinal recess 11 and the hook portion 5 is pivoted below the coat hanger hook 4. The coat hanger hook 4 is then drawn off the rail by load hook 3 and can be conveyed by the roller apparatus 1 whose load receiving means 2 is now completely pivoted downwards again.

Figure 3:
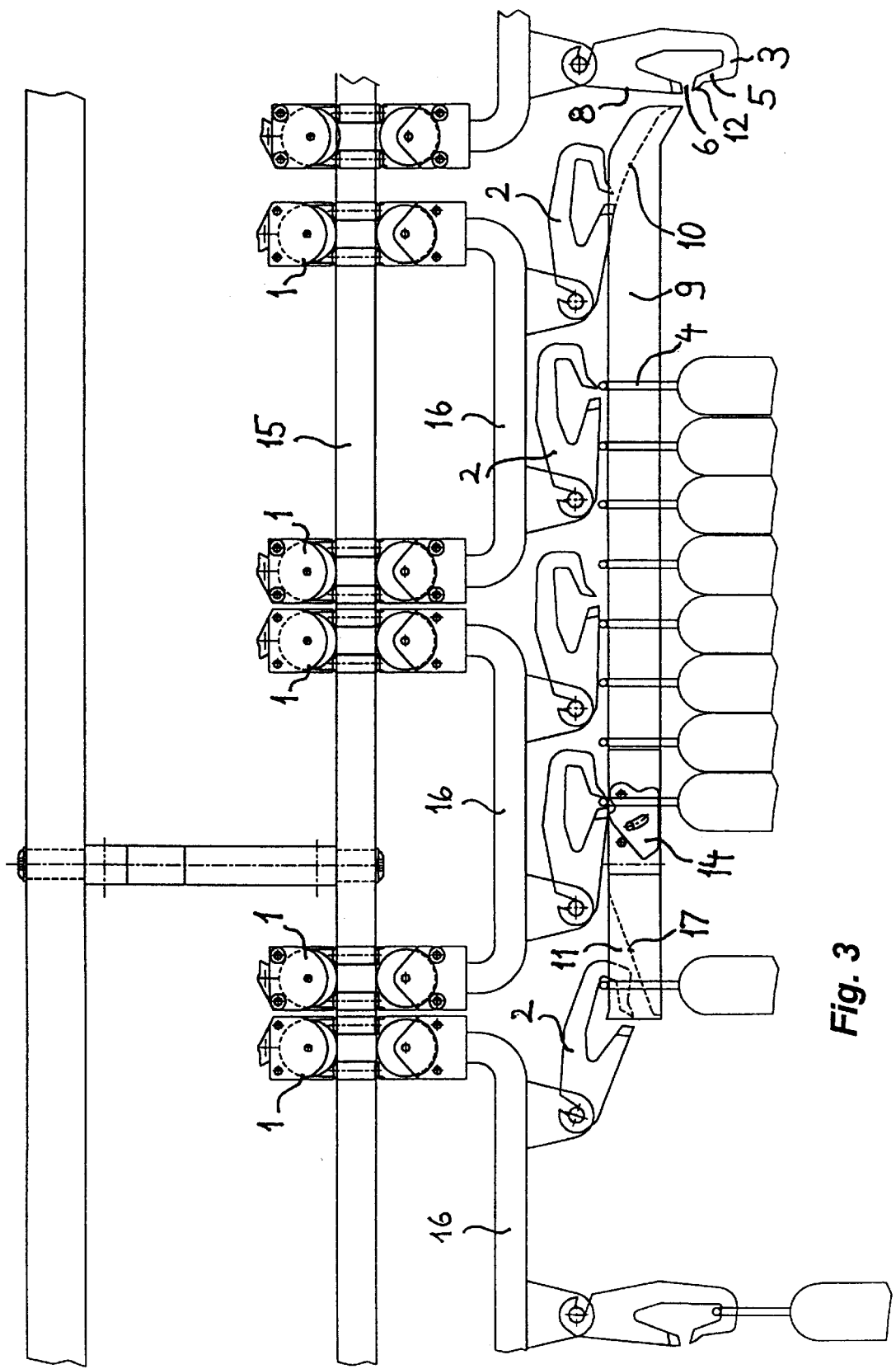
FIG. 3 shows the charging/discharging station when a plurality of load receiving means of intercoupled tandem trolleys are successively charged.
Figure 4:
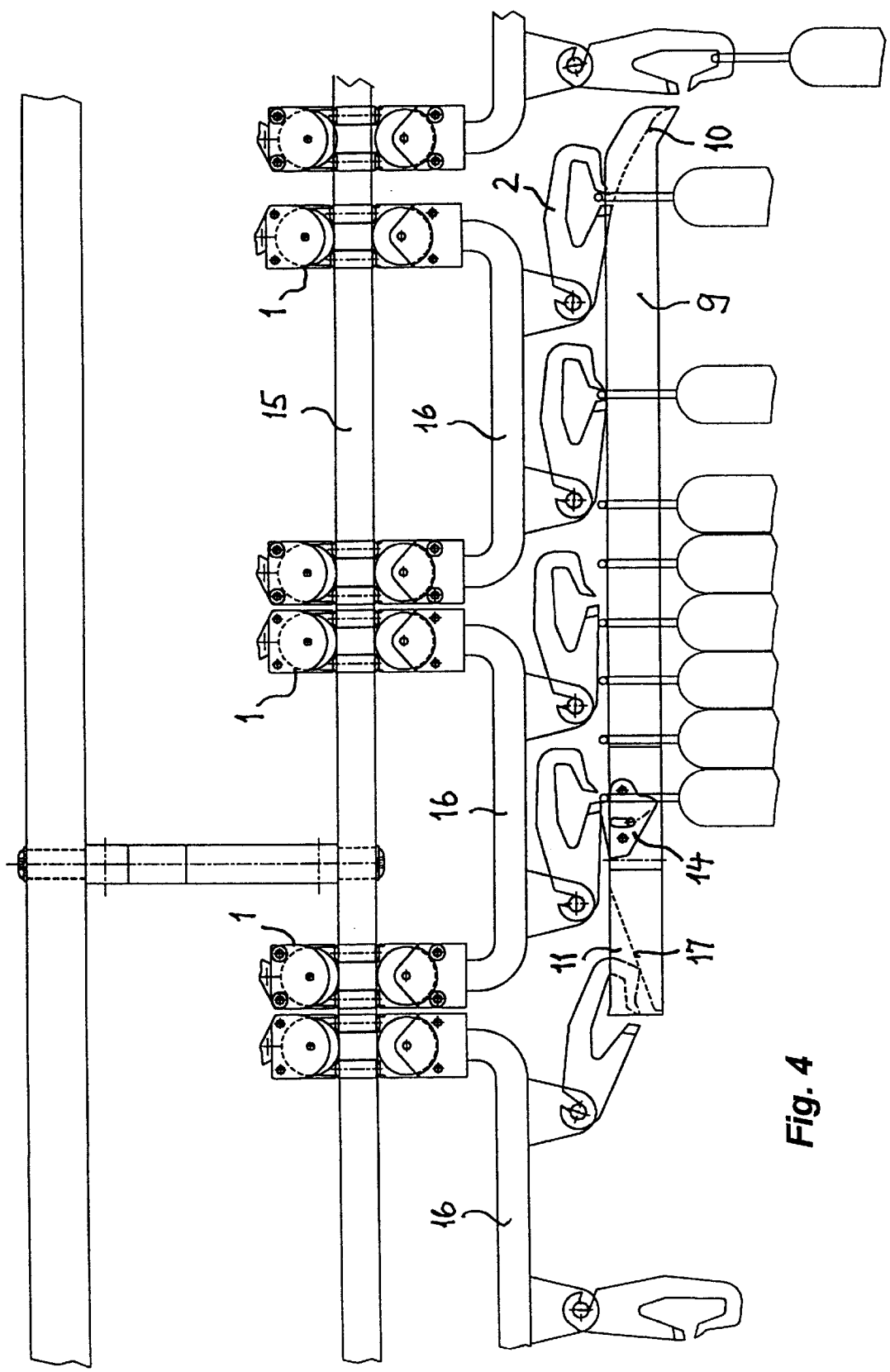
FIG. 4 shows the charging/discharging station when a plurality of load receiving means of intercoupled tandem trolleys are successively discharged.

In the embodiment shown in FIGS. 3 and 4, the load carrying means 16 is implemented by a horizontal load bar borne by two roller apparatuses 1 forming a tandem trolley. A plurality of load receiving means 2 are pivotably suspended from this load bar. As shown in FIGS. 3 and 4, charging and discharging of the load receiving means 2 with coat hanger hooks 4 is performed in the same way as in the embodiment according to FIGS. 1 and 2.

Further, according to the embodiment shown in FIGS. 3 and 4, the longitudinal recess 11 is not formed as a vertical slot but as a groove having a gliding bottom 17 obliquely descending in the conveying direction so that the load receiving means 2 pivot downwards in a gradual manner as controlled by the cooperation of load hook 3 and gliding bottom 17. Further according to FIGS. 3 and 4, the lifter 14 is designed as a pivot plate which is arranged within rail 9 and can be selectively controlled by drive means (not shown), such as a lifting cylinder or solenoid, to be retracted completely in rail 9 (FIG. 3), or to be pivoted slightly above the top surface of rail 9 (FIG. 4) in order to act as a stop for retaining the coat hanger hooks 4 and to lift the slide ramp 8 of the respective load receiving means 2 to disengage the free end of its hook portion 5 from the coat hanger hook to be retained.

Instead of providing the guiding ramp 10, it is also possible to lower the rail path for the roller apparatuses 1 in the area of the charging/discharging station.

We claim:

1. A suspension conveyor system comprising a plurality of roller apparatuses (1) displaceable on a rail network, the lower end of each roller apparatus (1) being provided with a load carrying means (16) including a load receiving means (2) having a load hook (3) for receiving a coat hanger hook (4), wherein the side of the load hook (3) oriented in the conveying direction comprises a hook portion (5) extending upwardly, the upper end of the hook portion (5) being confined by an aperture (6), characterised in that the load receiving means (2) is hinged to the load carrying means (16) to be pivotable, against the conveying direction, about a horizontal axis (7) up to a raised position in which the aperture (6) is facing to the bottom, that a slide ramp (8) is arranged on the load receiving means (2) on the side of the aperture (6) opposite to the upwardly extending hook portion (5), that a charging/discharging station is provided having a rail (9) extending parallelly to the conveying direction in the travelling path of the load receiving means (2), from which rail (9) the coat hanger hooks (4) can be suspended, the end of the rail (9) opposite to the conveying direction comprising a guiding ramp (10) cooperating with the slide ramp (8) to pivot the respective load receiving means (2) to its raised position, the end of the rail (9) oriented in the conveying direction comprising a longitudinal recess (11) opening towards the top and in the conveying direction, said longitudinal recess (11) being formed such as to allow the slide ramp (8) and the hook portion (5) to enter the longitudinal recess (11).

2. The suspension conveyor system according to claim 1, characterised in that the free end of the hook portion (5) confined by the aperture (6) is in the form of an outwardly bent tip (12).

3. The suspension conveyor system according to claim 1, characterised in that a restoring spring (13) engages the load receiving means (2) in the raised position thereof.

4. The suspension conveyor system according to claim 1, characterised in that the charging/discharging station is provided with a lifter (14) which can be controllably displaced into the path of the load receiving means (2) such that the slide ramp (8) of the load receiving means (2) can slide over the lifter (14) in the raised position thereof.

5. The suspension conveyor system according to claim 1, characterised in that the top surface of the rail (9) is provided with a longitudinal groove which the free end of the hook portion (5) can enter.

6. The suspension conveyor system according to claim 1, characterised in that the longitudinal recess (11) has a gliding bottom (17) obliquely descending in the conveying direction.

7. The suspension conveyor system according to claim 1, characterised in that the load carrying means (16) is arranged as a horizontal bar carried by two roller apparatuses (1), and that a plurality of load receiving means (2) according to any one of claims 1 to 3 are pivotably suspended from said bar at intervals greater than the length of the load receiving means (2) as measured between the axis (7) and the end of each load receiving means (2) facing away from the axis (7).

* * * * *